United States Patent
Sun et al.

(10) Patent No.: US 10,122,738 B2
(45) Date of Patent: Nov. 6, 2018

(54) BOTNET DETECTION SYSTEM AND METHOD

(71) Applicant: Acer Incorporated, New Taipei (TW)

(72) Inventors: Ming-Kung Sun, New Taipei (TW); Chiung-Ying Huang, New Taipei (TW); Zong-Cyuan Jhang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 125 days.

(21) Appl. No.: 15/215,311

(22) Filed: Jul. 20, 2016

(65) Prior Publication Data
US 2017/0310687 A1    Oct. 26, 2017

(30) Foreign Application Priority Data
Apr. 25, 2016    (TW) ............................. 105112772 A

(51) Int. Cl.
*H04L 29/06*    (2006.01)

(52) U.S. Cl.
CPC ........ *H04L 63/1416* (2013.01); *H04L 63/101* (2013.01); *H04L 63/1425* (2013.01); *H04L 2463/144* (2013.01)

(58) Field of Classification Search
CPC ............... H04L 63/1416; H04L 63/101; H04L 63/1425
See application file for complete search history.

(56) References Cited

U.S. PATENT DOCUMENTS

| 8,307,459 | B2 | 11/2012 | Lee et al. |
| 8,341,742 | B2 | 12/2012 | Lee et al. |
| 8,762,298 | B1 * | 6/2014 | Ranjan ..................... G06N 5/02 706/12 |
| 2007/0245420 | A1 * | 10/2007 | Yong ...................... H04L 41/28 726/23 |

(Continued)

FOREIGN PATENT DOCUMENTS

| TW | 201103281 A1 | 1/2011 |
| TW | 201126983 A1 | 8/2011 |
| TW | 201230722 A1 | 7/2012 |

(Continued)

OTHER PUBLICATIONS

Chinese language office action dated Sep. 13, 2017, issued in application No. TW 105112772.

*Primary Examiner* — Mohammed Waliullah
(74) *Attorney, Agent, or Firm* — McClure, Qualey & Rodack, LLP

(57) ABSTRACT

A botnet detection system and method are provided. The method includes the steps of: retrieving a network log file of a computer device; refining the network log file according to a device alive-time record of the computer device and a network white list to obtain a plurality of individual network log files, wherein each individual network log file records time information, a source IP address of the computer device, and an individual destination IP address; and analyzing a plurality of connection intervals of the source IP address connecting to the individual destination IP address in each individual network log file to determine whether the computer device exhibits connection behavior that indicates infection by a botnet malware.

5 Claims, 5 Drawing Sheets

(56) References Cited

U.S. PATENT DOCUMENTS

2010/0174793 A1* 7/2010 Wieneke .............. G06Q 10/107
709/206
2017/0111566 A1* 4/2017 Nemoto ................... H04N 9/04

FOREIGN PATENT DOCUMENTS

| TW | 201427334 A | 7/2014 |
| TW | 201429191 A | 7/2014 |
| TW | M504990 U | 7/2015 |

* cited by examiner

200

| Time | Source IP address | Destination IP address | Others |
|------|-------------------|------------------------|--------|
| Data | Data              | Data                   | Data   |

| Time | Source IP address | Destination IP address |
|------|-------------------|------------------------|
| Data | Data              | Data                   |

| Time | Source IP address | Destination IP address |
|------|-------------------|------------------------|
| T1   | SIP1              | DIP1                   |
| T2   | SIP1              | DIP1                   |
| T3   | SIP1              | DIP2                   |
| T4   | SIP1              | DIP2                   |

| Time | Source IP address | Destination IP address |
|---|---|---|
| T1 | SIP1 | DIP1 |
| T2 | SIP1 | DIP1 |

| Time | Source IP address | Destination IP address |
|---|---|---|
| T3 | SIP1 | DIP2 |
| T4 | SIP1 | DIP2 |

FIG. 3C

BOTNET DETECTION SYSTEM AND METHOD

CROSS REFERENCE TO RELATED APPLICATIONS

This application claims priority of Taiwan Patent Application No. 105112772, filed on Apr. 25, 2016, the entirety of which is incorporated by reference herein.

BACKGROUND OF THE INVENTION

Field of the Invention

The invention relates to botnet detection, and, in particular, to a botnet detection system and method thereof.

Description of the Related Art

Conventionally, detection of botnet malware can be implemented using feature matching techniques that are usually adapted by the antivirus software providers on the market. However, if the behavior of a botnet malware changes, it becomes a new sample for the existing antivirus software, resulting in botnet detection failure. The term "botnet" refers to a collection of malicious software agents (referred to as robots) that run autonomously and automatically. The term "botnet" can also be used to refer to a collection of compromised computers (referred to as bots) each infected with one or more of such malicious software agents. For example, the infection may be a result of installation via drive-by downloads exploiting web browser vulnerabilities, worms, Trojan horses, or backdoors, under a common command-and-control infrastructure. Typically, the owner (i.e., originator, operator, or controller) of a botnet uses the botnet to coordinate spam campaigns, launch denial-of-service attacks, or steal sensitive information.

A botnet's originator can control the bots remotely from a command-and-control (C&C) server. However, it is difficult to detect the communication channels used by the command-and-control server of the botnet since some techniques, such as bypassing the network firewall, using a unique encryption scheme for stealth, or rapidly switching network domains, are usually used by the botnet.

Accordingly, there is demand for a simple and effective botnet detection system and method to solve the aforementioned problems.

BRIEF SUMMARY OF THE INVENTION

A detailed description is given in the following embodiments with reference to the accompanying drawings.

In an exemplary embodiment, a botnet detection method is provided. The method includes the steps of: retrieving a network log file of a computer device; refining the network log file according to a device alive-time record of the computer device and a network white list to obtain a plurality of individual network log files, wherein each individual network log file records time information, a source IP address of the computer device, and an individual destination IP address; and analyzing a plurality of connection intervals of the source IP address connecting to the individual destination IP address in each individual network log file to determine whether the computer device exhibits connection behavior that indicates infection by a botnet malware.

In another exemplary embodiment, a botnet detection system is provided. The botnet detection system includes: a memory unit and a processor. The memory unit is for storing a botnet detection program. The processor is configured to retrieve a network log file of a computer device, and execute the botnet detection program to analyze the network log file. The processor refines the network log file according to a device alive-time record of the computer device and a network white list to obtain a plurality of individual network log files, wherein each individual network log file records time information, a source IP address of the computer device, and an individual destination IP address. The processor further analyzes a plurality of connection intervals of the source IP address connecting to the individual destination IP address in each individual network log file to determine whether the computer device exhibits connection behavior that indicates infection by a botnet malware.

BRIEF DESCRIPTION OF THE DRAWINGS

The invention can be more fully understood by reading the subsequent detailed description and examples with references made to the accompanying drawings, wherein:

FIG. 2A is a diagram illustrating different columns of a network log file in accordance with an embodiment of the invention;

FIG. 2B is a diagram illustrating different columns of a filtered network log file in accordance with an embodiment of the invention;

FIG. 3A is a diagram of a network log file in accordance with an embodiment of the invention;

FIGS. 3B and 3C are diagrams of different individual network log files in accordance with an embodiment of the invention.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
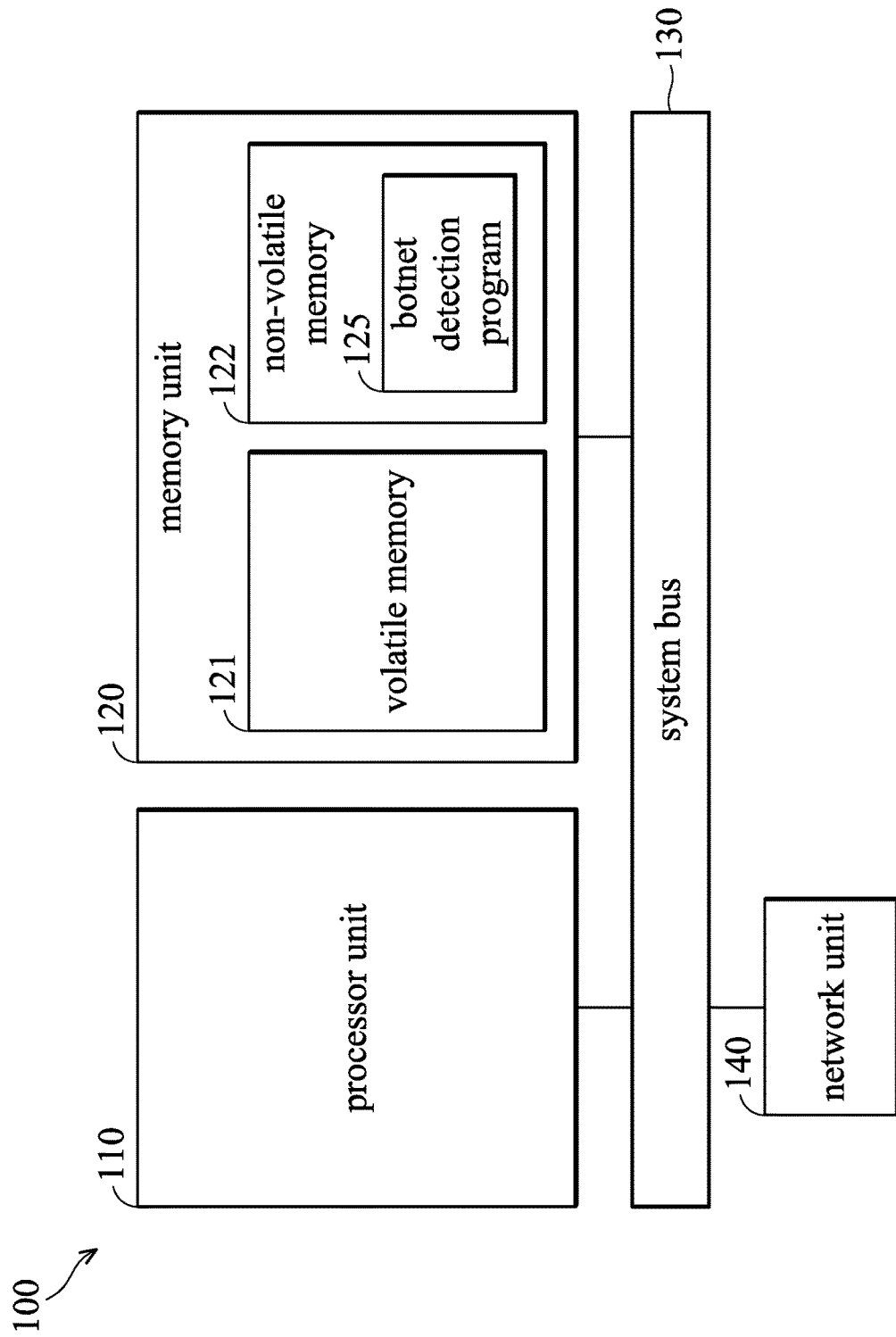
FIG. 1 is a block diagram of a botnet detection system in accordance with an embodiment of the invention.

FIG. 1 is a block diagram of a botnet detection system in accordance with an embodiment of the invention. In an embodiment, the botnet detection system 100 may comprise one or more personal computers or servers. For example, the botnet detection system 100 may comprise one or more processing units 110, a memory unit 120, a system bus 130, and a network unit 140. The processing unit 110, the memory unit 120, and the network unit 140 are coupled to each other via the system bus 130. The processing unit 110, for example, may be a central processing unit (CPU) or a general-purpose processor, but the invention is not limited thereto.

The memory unit 120 may comprise a volatile memory 121 and a non-volatile memory 122, wherein the volatile memory 121 may be a random access memory such as a dynamic random access memory (DRAM) or a static random access memory (SRAM). The non-volatile memory 122 may be a hard disk, a flash memory, or a solid-state disk, but the invention is not limited thereto. The network unit 140 may comprise one or more network interfaces compatible with multiple wired or wireless communication protocols that are used to connect the botnet detection system 100 to other electronic devices.

The non-volatile memory 122 stores a botnet detection program 125. The processing unit 110 loads the botnet detection program 125 from the non-volatile memory 122 to the volatile memory 121, and executes the botnet detection program 125. For example, the botnet detection program 125 may analyze the network log files from one or more computers or servers to determine whether the computers or servers associated with the analyzed network log files have been infected by the malware, especially the botnet beacon, the details of which will be described later. It should be noted that the botnet detection system 100 may retrieve network log files of other computers or servers via the network unit 140, or via peripheral devices connected to the system bus 130 (e.g. USB storage devices), but the invention is not limited thereto.

Generally, the agents and the master of the botnet may communicate with each other via beaconing, thereby maintaining connections and delivering commands from the master. However, the network connection behavior or events of the computers or servers connecting to other devices are recorded in the network log files. For example, the network log file may include, but is not limited to, date and time, source network addresses, destination addresses, applications, connection status, device alive time, message types, message content, offset values, etc. One having ordinary skill in the art will appreciate that the content in a network log file may include other types of columns or records, and the details will be omitted here. Generally, the size of the network log file of a single computer may be from hundreds of MBs up to several GBs, and the content in the network log file includes various columns and records as described above, and thus it is not possible for an administrator of the computer to easily detect that the computer has been infected by the botnet malware by manually inspecting the network log file. Accordingly, a dedicated botnet detection program is disclosed in the application to determine whether the computer has been infected by botnet malware (e.g. malware such as botnet or Trojan horse).

FIG. 2A is a diagram illustrating different columns of a network log file in accordance with an embodiment of the invention. FIG. 2B is a diagram illustrating different columns of a filtered network log file in accordance with an embodiment of the invention. In an embodiment, the botnet detection program 125 classifies the original network log file 200 into four columns such as date and time, source IP addresses, destination IP address, and others, as shown in FIG. 2A. Because the amount of data in the network log file is usually very large, the botnet detection program 125 may filter out data in the "others" column to generate a filtered network log file 210 before determining that botnet malware is present, as shown in FIG. 2B. It should be noted that the "others" column includes data other than date and time, source IP addresses, and destination IP addresses.

FIG. 3A is a diagram of a network log file in accordance with an embodiment of the invention. FIGS. 3B and 3C are diagrams of different individual network log files in accordance with an embodiment of the invention. In an embodiment, the botnet detection program 125 analyzes connections between each source IP address and each destination IP address. For example, the network log file 300, as shown in FIG. 3A, includes columns for the source IP address 1, and destination IP addresses 1 and 2. It should be noted that the network log file 300 is a filtered network log file in which the "others" data other than date and time, source IP addresses, and destination IP addresses have been filtered out of the original network log file. The botnet detection program classifies the network log file in FIG. 3A into individual network log files 310 and 320 as shown in FIG. 3B and FIG. 3C. For example, the individual network log file 310 records data associated with the source IP address SIP1, the destination IP address DIP1, and associated recording time such as T1 and T2. The individual network log file 310 records data associated with the source IP address SIP1, the destination IP address DIP2, and associated recording time such as T3 and T4. Then, the botnet detection program 125 performs operations on the data that the computer associated with the source IP address SIP1 is activated (i.e. alive).

Specifically, the network log data is meaningful when the computer associated with the source IP address SIP1 is alive. In order not to increase the burden of the botnet detection system 100, the botnet detection program 125 only analyzes meaningful data in the network log files. For purposes of description, there are only a source IP address and two destination IP addresses in the aforementioned embodiments. One having ordinary skill in the art will appreciate that a network log file may record connections between one or more source IP addresses and one or more destination IP addresses, and the number of sources IP addresses and destination IP addresses may depend on the practical situation.

In an embodiment, the botnet detection program 125 analyzes data in the individual network log file to obtain time intervals that a source IP address of a computer is connected to a destination IP address, and calculates the standard deviation SD and the average AVG of the time intervals. For example, the botnet detection program 125 may determine a connection frequency feature value $T_{FVALUE}$ indicating the connection frequency of the source IP address connecting to the destination IP address according to the calculated standard deviation SD and average AVG. The connection frequency feature value $T_{FVALUE}$ can be expressed by the following formula:

$$T_{FValue} = \frac{SD}{AVG} \tag{1}$$

Then, the botnet detection program 125 may determine whether the destination IP address is a destination IP address of a malware according to the connection frequency feature value $T_{FVALUE}$ of the connection frequency. Specifically, when the connection frequency feature value $T_{FVALUE}$ is smaller, it indicates that the variation of the connection frequency that the source IP address is connected to the destination IP address is smaller. When the connection frequency feature value $T_{FVALUE}$ is larger, it indicates that the variation of the connection frequency that the source IP address is connected to the destination IP address is also larger. In addition, when a computer is infected by a botnet malware, the variation of the connection frequency that the source IP address is connected to the destination IP address is relatively small. Accordingly, if the connection frequency feature value $T_{FVALUE}$ is smaller than a predetermined threshold, the botnet detection program 125 may determine that the destination IP address is a possible destination IP address of a botnet malware. If the connection frequency feature value $T_{FVALUE}$ is larger than a predetermined threshold, the botnet detection program 125 may determine that the destination IP address is not a destination IP address of a botnet malware.

In an embodiment, the connection frequency feature value can be expressed by the following formula:

$$T_{FValue} = \frac{ConnFreq(DAT, DTD, WLF)_{SD}}{ConnFreq(DAT, DTD, WLF)_{AVG}}$$

where ConnFreq denotes a function of the connection frequency; DAT denotes records of device alive time; DTD denotes the connection status of the program of the device connecting to external destination IP addresses; and WLF denotes a network white list filter that records guaranteed secure destination IP addresses to be filtered out of the original network log file. Specifically, it is disclosed that various information is recorded in the original network log file in the aforementioned embodiments. The botnet detection program 125 may filter data other than date and time, source IP addresses, and destination IP addresses out of the original network log file, and determine the connection status and time intervals that the computer device connects to external destination IP addresses according to the remaining columns (i.e. date and time, source IP addresses, and destination IP addresses). Then, the botnet detection program 125 may further filter the remaining columns with the device alive time (DAT) and the white list of the network firewall or router to obtain the filtered connection status that is required for analysis.

More specifically, the DTD may be recorded within every time slot (e.g. 1 minute by the network firewall. The device alive time can be obtained from the device boot-up record, the DTD, or the event log file of the computer. The network white list filter WLF records predefined secure destination IP addresses of the network firewall or router.

Table 1 shows the connection intervals of the source IP address SIP1 to different destination IP addresses DIP1, DIP2 and DIP3 that are obtained from the individual network log files of the computer.

TABLE 1

| Data No. | Individual network log file 1 SIP→DIP1 | Individual network log file 2 SIP→DIP2 | Individual network log file 3 SIP→DIP3 |
| --- | --- | --- | --- |
| 1 | 6 | 9 | 10 |
| 2 | 9 | 11 | 11 |
| 3 | 5 | 9 | 10 |
| 4 | 7 | 10 | 10 |
| 5 | 3 | 13 | 11 |
| 6 | 14 | 10 | 11 |
| 7 | 6 | 12 | 10 |
| 8 | 22 | 6 | 10 |
| 9 | 8 | 10 | 10 |
| 10 | 20 | 11 | 11 |
| AVG | 10 | 10.1 | 10.4 |
| SD | 6.497862897 | 1.91195072 | 0.489897949 |

For example, the botnet detection program 125 classifies the original network log file of the computer into three individual network log files according to different destination IP addresses, and each of the individual network log files records connection time of the source IP address SIP to a respective destination IP address such as DIP1, DIP2, or DIP3. The botnet detection program 125 may calculate the connection intervals in each of the individual network log files, as shown in Table 1.

Referring to Table 1, the average values of the connection intervals in the three individual network log file are very close to 10, but the standard deviations of the connection intervals in the three individual network log file vary. For example, the standard deviations of the connection intervals in the individual network log files 1~3 are 6.497862897, 1.91195072, and 0.489897949, respectively. Accordingly, the botnet detection program 125 may calculate the connection frequency feature values of the individual network log files 1~3 are 0.6497862897, 0.18930205, and 0.04710557, respectively. Given that the predetermined threshold is 0.1, the botnet detection program 125 may determine that the destination IP address DIP3 in the individual network log file 3 may be a possible destination IP address of a botnet malware. In addition, the botnet detection program 125 may further determine that the computer associated with the source IP address SIP may be infected by a botnet malware.

Figure 4:
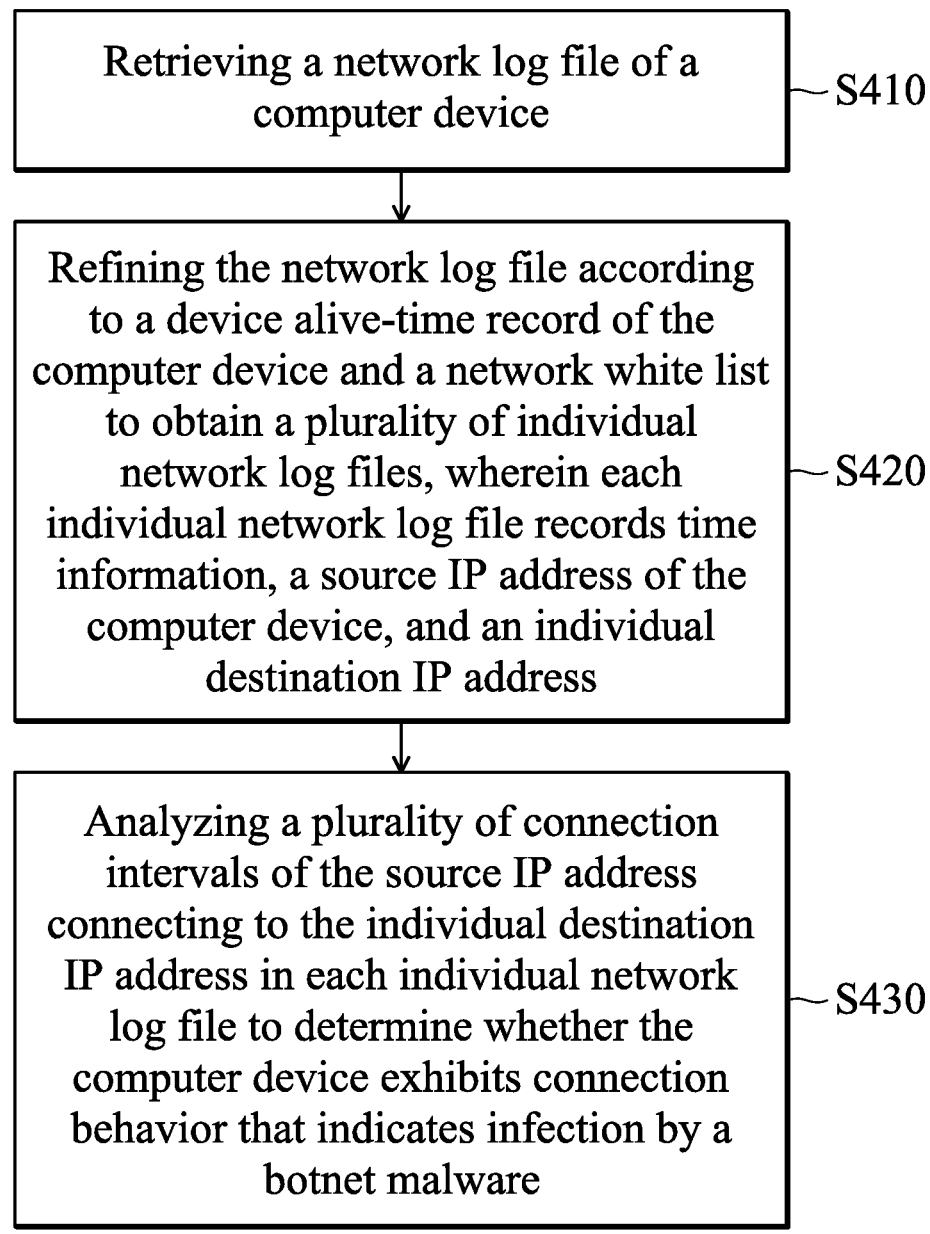
FIG. 4 is a flow chart of a botnet detection method in accordance with an embodiment of the invention.

FIG. 4 is a flow chart of a botnet detection method in accordance with an embodiment of the invention. In step S410, a network log file of a computer device is retrieved. For example, the network log file may include, but not limited to, date and time, source network addresses, destination addresses, applications, connection status, device alive time, message types, message content, offset values, etc.

In step S420, the network log file is refined according to the device alive time of the computer device and a network white list to obtain a plurality of individual network log files, wherein each individual network log file records time information, a source IP address of the computer device, and an individual destination IP address. Briefly, the aforementioned refining step is to filter information other than the time information, the source IP address, and the destination IP addresses out of the network log file, and classifies the filtered network log file into a plurality of individual network log files according to different destination IP addresses. In addition, the network log file is also incorporated with the device alive time, and the predefined secure IP addresses in the network white list are also filtered out of the network log file.

In step S430, a plurality of connection intervals of the source IP address to the individual destination IP address in each individual network log file are analyzed to determine whether the computer device exhibits connection behavior that indicates infection by a botnet malware.

In view of the above, a botnet detection system and method are provided in the invention, and the botnet detection system and method are capable of detecting the connection intervals of each source IP address to different destination IP addresses, and analyzing the connection intervals to determine whether the computer device associated with each source IP address is infected by a botnet malware. A novel determination mechanism for the botnet malware is provided in the botnet detection system and method of the invention, thereby more effectively detecting the existence of the botnet malware than the conventional determination mechanism using feature matching.

The methods, or certain aspects or portions thereof, may take the form of program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A botnet detection method, comprising:
   retrieving a network log file of a computer device;
   refining the network log file according to a device alive-time record of the computer device and a network white list to obtain a plurality of individual network log files, wherein each individual network log file records time information, a source IP address of the computer device, and an individual destination IP address;
   calculating an average value and a standard deviation of the connection intervals of the source IP address connecting to the individual destination IP address in each individual network log file;
   calculating a connection frequency feature value of each individual network log file by dividing the standard deviation by the average value;
   determining whether the computer device exhibits connection behavior that indicates infection by a botnet malware according to the calculated connection frequency feature value;
   if the connection frequency feature value of each individual network log file is larger than the predetermined threshold, determining that the computer device does not exhibit connection behavior that indicates infection by the botnet malware; and
   if the connection frequency feature value of each individual network log file is smaller than the predetermined threshold, determining that the computer device exhibits connection behavior that indicates infection by the botnet malware.

2. The botnet detection method as claimed in claim 1, further comprising:
   determining whether the connection frequency feature value is smaller than a predetermined threshold.

3. A botnet detection system, comprising:
   a memory unit, for storing a botnet detection program; and
   a processor, configured to retrieve a network log file of a computer device, and execute the botnet detection program to analyze the network log file,
   wherein the processor refines the network log file according to a device alive-time record of the computer device and a network white list to obtain a plurality of individual network log files, wherein each individual network log file records time information, a source IP address of the computer device, and an individual destination IP address,
   wherein the processor further calculates an average value and a standard deviation of the connection intervals in each individual network log file, calculates a connection frequency feature value of each individual network log file by dividing the standard deviation by the average value,
   wherein the processor further determines whether the computer device exhibits connection behavior that indicates infection by a botnet malware according to the calculated connection frequency value;
   if the connection frequency feature value of each individual network log file is larger than the predetermined threshold, determining that the computer device does not exhibit connection behavior that indicates infection by the botnet malware; and
   if the connection frequency feature value of each individual network log file is smaller than the predetermined threshold, determining that the computer device exhibits connection behavior that indicates infection by the botnet malware.

4. The botnet detection system as claimed in claim 3, wherein the processor further determines whether the connection frequency feature value is smaller than a predetermined threshold.

5. The botnet detection system as claimed in claim 4, wherein the processor further determines that the computer device does not exhibit connection behavior that indicates infection by the botnet malware if the connection frequency feature value of each individual network log file is larger than the predetermined threshold, and
   the processor further determines that the computer device exhibits connection behavior that indicates infection by the botnet malware if the connection frequency feature value of each individual network log file is smaller than the predetermined threshold.

* * * * *